United States Patent [19]
Beach et al.

[11] Patent Number: 5,593,931
[45] Date of Patent: Jan. 14, 1997

[54] CYCLOPENTADIENYL GROUP 6B METAL ALPHA-OLEFIN POLYMERIZATION CATALYSTS AND PROCESS FOR POLYMERIZING ALPHA-OLEFINS

[75] Inventors: David L. Beach, Kingwood, Tex.; Michael J. Carney, Eldersburg, Md.; Javier M. Mora, Houston, Tex.

[73] Assignee: Chevron Chemical Company, San Ramon, Calif.

[21] Appl. No.: 397,828

[22] Filed: Mar. 3, 1995

[51] Int. Cl.$^6$ .................... C08F 4/622; C08F 10/00; B01J 31/00
[52] U.S. Cl. ............... 502/117; 502/152; 502/154; 502/155; 526/114; 526/160; 526/130
[58] Field of Search .................. 502/103, 113, 502/117, 152; 526/114, 160, 130

[56] References Cited

U.S. PATENT DOCUMENTS

| | | |
|---|---|---|
| 4,015,059 | 3/1977 | Karol . |
| 4,530,914 | 7/1985 | Ewen et al. . |
| 4,939,217 | 7/1990 | Stricklen . |
| 4,975,403 | 12/1990 | Ewen . |
| 5,079,317 | 1/1992 | Tajima et al. . |
| 5,169,816 | 12/1992 | Dawkins . |
| 5,169,817 | 12/1992 | Dawkins . |
| 5,183,868 | 2/1993 | Nordquest ................. 502/117 |
| 5,240,895 | 8/1993 | Carney et al. . |
| 5,418,200 | 5/1995 | Carney et al. ............. 502/117 |

FOREIGN PATENT DOCUMENTS

| | | | |
|---|---|---|---|
| 0295312 | 12/1987 | European Pat. Off. | ........ C08F 10/00 |
| 0509294 | 3/1992 | European Pat. Off. | ........ C08F 10/00 |
| 1253063 | 11/1968 | United Kingdom . | |

OTHER PUBLICATIONS

Theopold, Acc. Chem. Res (1990), 23, "Organochromium (III) Chemistry: A Neglected Oxidation State", pp. 263–270.

Theopold, J. Am. Chem. Soc. (1988), 110, "Cationic Chromium (III) Alkyls as Olefin Polymerization catalysts", pp. 5902–5903.

Thomas et al., J. Am. Chem. Soc. (1991), 113, "Paramagnetic Alkylchromium Compounds as Homogeneous Catalyst for the Polymerization of Ethylene", pp. 893–902.

*Primary Examiner*—Glenn A. Caldarola
*Attorney, Agent, or Firm*—R. C. Gaffney

[57] ABSTRACT

Disclosed is a catalyst system for the homopolymerization of alpha-olefins having 2–8 carbon atoms, said catalyst system comprising a mixed-valent dimeric Group 6b metal compound catalyst precursor wherein one atom of said Group 6b metal is a cyclopentadienyl Group 6b metal hydrocarbyl complex in which the Group 6b metal has an oxidation state +3 and wherein one atom of said Group 6b metal is a cyclopentadienyl alkaryl complex in which the Group 6b metal has an oxidation state +1, said dimeric Group 6b metal compound being supported on an inorganic support. The catalyst system can contain, in addition, a Group 2 or Group 3 metal-alkyl compound.

20 Claims, No Drawings

CYCLOPENTADIENYL GROUP 6B METAL ALPHA-OLEFIN POLYMERIZATION CATALYSTS AND PROCESS FOR POLYMERIZING ALPHA-OLEFINS

FIELD OF THE INVENTION

The present invention relates to catalyst systems for polymerizing alpha-olefins and processes for polymerizing alpha-olefins using such catalysts.

BACKGROUND OF THE INVENTION

Chromium based catalysts are used in the commercial polymerization of small alpha-olefins such as ethylene and propylene. One such catalyst is prepared by depositing chromocene (bis(cyclopentadienyl) chromium (II)) on an inorganic metal oxide support, as disclosed in British Patent No. 1,253,063 to Karapinka. U.S. Pat. No. 4,015,059, issued Mar. 29, 1977 to Karol, describes the use of bis(indenyl)— and bis(fluorenyl)-chromium (II) compounds supported on activated inorganic oxide supports as catalysts for the polymerization of ethylene.

Recently, new synthetic methods have been described for preparing $Cr^{+3}$ organometallic compounds. Theopold, *J. Am. Chem Soc.* (1988), 110, 5902 entitled "Cationic Chromium (III) Alkyls as Olefin Polymerization Catalysts," Theopold, *Acc. Chem. Res.* (1990), 23, 263 entitled "Organochromium (III) Chemistry: A Neglected Oxidation State" and Thomas et at., *J. Am. Chem. Soc.*, (1991), 113, 893 et seq. disclose that certain pentamethylcyclopentadienyl chromium (III) alkyls can be prepared, and that they can be used for making polyethylene homogeneously in $CH_2Cl_2$. However, these homogeneous Cr (III) polymerization catalysts have several deficiencies. These include low polymer productivity, rapid deactivation, and the need to use polar, non-coordinating solvents. Additionally, since they are homogeneous catalysts, they are unsuitable for gas phase olefin polymerizations.

U.S. Pat. No. 4,530,914, issued Jul. 23, 1985 to Ewen et at., discloses a catalyst system for the polymerization of alpha-olefins which comprises two or more metallocenes, each having different propagation and termination rate constants, and aluminoxane. The metallocenes are cyclopentadienyl derivatives of a transition metal of Group 4b, 5b, and 6b metals of the Periodic Table. They are described by the formulas $(C_5R'_m)_pR''_s(C_5R'_m)MeQ_{3-p}$ and $R''_s(C_5R'_m)_2MeQ'$ where $(C_5R'_m)$ is a cyclopentadienyl or substituted cyclopentadienyl, each R' is hydrogen or a hydrocarbyl radical, R" is an alkylene radical, a dialkyl germanium or silicon or an alkyl phosphine or amine radical bridging two $(C_5R'_m)$ rings, Q is a hydrocarbon radical, Me is a Group 4b, 5b, or 6b metal, s is 0 or 1, p is 0, 1, or 2; when p=0, s=0; m is 4 when s is 1 and m is 5 when s is 0.

U.S. Pat. No. 4,939,217, issued Jul. 3, 1990 to Stricklen, also discloses a process for polymerizing olefins where the polymerization is conducted in the presence of hydrogen, and a catalyst system is used which contains aluminoxane and at least two metallocenes, each having different olefin polymerization termination rate constants. The metallocenes disclosed are similar to those described in aforementioned U.S. Pat. No. 4,530,914.

U.S. Pat. No. 4,975,403, issued Dec. 4, 1990 to Ewen, discloses a catalyst system for use in the polymerization of olefins. The catalyst system includes at least two different chiral, stereo-rigid metallocene catalysts of the formula $R''(C_5(R')_4)_2MeQ_p$ (where Me is a Group 4b, 5b, or 6b metal and $(C_5(R')_4)$ is a cyclopentadienyl or substituted cyclopentadienyl ring) and an aluminum compound.

Canadian Patent Application No. 2,000,567, published Apr. 13, 1990, discloses a process for producing polyethylene using a composite catalyst made up of a solid catalyst component typified by a selected chromium compound, a modified aluminum compound typified by a trialkylaluminum, and an alkylaluminum alkoxide compound. The chromium compound may be chromium oxide, and the modified aluminum compound may be the reaction product of an organoaluminum compound and water.

European Patent Application 0,509,294 A2 published Oct. 21, 1992 Bulletin 92\43 discloses a catalyst system for the homopolymerization and copolymerization of alpha-olefins having 2–8 carbon atoms. The catalyst system comprises a cyclopentadienyl Group 6b metal hydrocarbyl compound in which the metal has an oxidation state of +3, the Group 6b metal compound being supported on an inorganic support. Page four of the European Patent Application discloses dimer compounds having the formula:

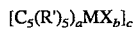

$[(C_5(R')_5)_aMX_b]_c$ wherein M is a Group 6b metal such as chromium, molybdenum and tungsten;

$(C_5(R')_5)$ is a cyclopentadienyl or substituted cyclopentadienyl ring;

R' is at each independent occurrence hydrogen, a hydrocarbyl radical having 1–20 carbon atoms, or adjacent R' groups may together form one or more rings;

X is a hydrocarbyl radical having 1–20 carbon atoms (for example, a monovalent saturated aliphatic or alicyclic radical or a monovalent aromatic radical, or combinations thereof);

a=1 or 2, b=1 or 2 where a+b=3;

c=1 or 2 with the proviso that when c=2 then x is alkyl.

When c is 1, the catalyst is a monomer and X is defined as a hydrocarbyl radical having 1–20 carbon atoms.

When c is 2, the catalyst is a dimer and X is alkyl. On page 4, lines 21–22, the term "hydrocarbyl" refers to "alkyl, alkenyl, aryl, aralkyl and alkaryl radicals and the like." On page 5, lines 3 and 4 indicate $[Cp^*Cr(CH_3)_2]_2$ is the preferred dimeric compound. In all cases, the Group 6b metal atom in the compound has an oxidation state of +3.

U.S. Pat. No. 5,240,895 issued Aug. 31, 1993 to Michael J. Carney and David L. Beach discloses a catalyst system for the homopolymerization and co-polymerization of alpha-olefins having 2–8 carbon atoms. The catalyst system comprises a dimeric or tetrameric cyclopentadienyl Group 6b metal compound in which the metal has an oxidation state of +2, the Group 6b metal compound being supported on an inorganic support. In column 5, lines 10 et seq, examples of the Group 6b metal compounds are disclosed having the formula:

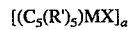

$[(C_5(R')_5)MX]_a$ wherein M is a Group 6b metal such as chromium, molybdenum and tungsten;

$(C_5(R')_5)$ is a substituted cyclopentadienyl ring;

R' is at each independent occurrence hydrogen, a hydrocarbyl radical having 1–20 carbon atoms, or adjacent R' groups may together form one or more hydrocarbyl rings, with the proviso that at least one R' is alkyl;

a=2 or 4;

X is at each independent occurrence a hydrocarbyl radical having 1–20 carbon atoms (for example a monovalent saturated aliphatic or alicyclic radical or a monovalent aryl, alkaryl radical, or combinations thereof), or an organosilyl group, such as trimethylsilylmethyl, when a=2 or hydrogen when a=4.

Examples of compounds having formula (I) above include, but are not limited to, [Cp*Cr(CH$_3$)]$_2$, [Cp*Cr(Bzyl)]$_2$, [Cp*Cr(Ph)]$_2$, [Cp*Cr(TMSM)]$_2$, where Bzyl is benzyl, Ph is phenyl, and TMSM is trimethylsilylmethyl.

It is also taught in the '895 patent, Column 5, line 1 et seq, that the strong chromium-chromium multiple bond present in [Cp*Cr(CH$_3$)]$_2$ makes it virtually unreactive towards ethylene (reference is made to an article by Heintz, R. A. et al; *Angew. Chem.* (1992), 104, 1100). The invention in the '895 patent was the discovery that depositing [Cp*Cr(CH$_3$)]$_2$ on a solid support generates a highly active, ethylene polymerization catalyst (See column 5, lines 5–7). In all cases the Group 6b metal compounds in the '895 reference have the metal in the +2 oxidation state.

Thus the prior art discloses the preparation of various Group 6b cyclopentadienyl type catalysts for the polymerizations of alpha-olefins and especially ethylene. The Group 6b metal, exemplified by chromium, is in all cases in the oxidation state of +2 or +3. It is not readily or reliably predictable whether a given chromium-cyclopentadienyl based catalyst system will be catalytically active for the polymerization of ethylene either in homogeneous type reactions or heterogeneous type reactions where the catalyst is deposited on an inorganic support. Further, it is also not readily or reliably predictable as to the nature of the polymer, if any, which will be produced, i.e., whether it will be of a low or high molecular weight or have a narrow or broad molecular weight distribution.

The type of ligands sigma bonded to the cyclopentadienyl-Cr are also important. The European Patent Application 0,509,294 A2, referred to above, teaches that the ligand ("X") is alkyl, i.e., CH$_3$ when a dimeric compound is employed with the chromium in the +3 oxidation state while the teachings of U.S. Pat. No. 5,240,895 above indicate the ligand "X") is hydrocarbyl when the chromium is in the +2 oxidation state.

SUMMARY OF THE INVENTION

It has now been discovered that when mixed-valent dimeric cyclopentadienyl Cr$^{+3}$—Cr$^{+1}$ compounds are supported on an inorganic support, high productivity alpha-olefin polymerization catalysts are produced. In addition, the use of a co-catalyst improves the productivity of these compounds. Also, these catalysts produce linear polyethylenes.

In accordance with the present invention, there is provided a catalyst system for the homopolymerization of alpha-olefins having 2–8 carbon atoms, said catalyst system comprising a mixed-valent dimeric cyclopentadienyl Group 6b metal compound catalyst precursor wherein one atom of the Group 6b metal is a cyclopentadienyl Group 6b metal hydrocarbyl complex in which the Group 6b metal is in the +3 oxidation state and one atom of the Group 6b metal is a cyclopentadienyl alkaryl complex in which the Group 6b metal is in the +1 oxidation state, said dimeric Group 6b metal compound being supported on an inorganic support. The above catalyst system is enhanced by the addition of a co-catalyst selected from Group 2 or 3 metal alkyl compounds.

In the above catalyst systems and processes, chromium is a preferred Group 6b metal, silica aluminum phosphate, and alumina-aluminum phosphate are preferred supports, and aluminoxanes and trialkylaluminum compounds are preferred Group 2 or 3 metal alkyl compounds.

Among other factors, the present invention is based on the discovery that the catalyst systems of the present invention have high activity (in terms of amount of polymer produced per mount of chromium per hour) and produce ethylene homopolymers with a high degree of linearity.

DETAILED DESCRIPTION OF PREFERRED EMBODIMENTS

The present invention provides catalyst systems for use in the homopolymerization of C$_2$–C$_8$ alpha-olefins, including ethylene, propylene, 1-butene, 1-hexene, 4-methyl-1-pentene, and 1-octene.

It has quite surprisingly been found that, even though the productivity of many cyclopentadienyl Group 6b metal compounds is quite low when employed as catalysts in the homogeneous polymerization of alpha-olefins, when these compounds are supported on a solid inorganic support such as an inorganic phosphate solid support, their productivity increases dramatically, especially when co-catalysts are used. It is now quite surprisingly been found that dimeric mixed-valent cyclopentadienyl Group 6b metal compounds, wherein one atom of the metal is in the +3 oxidation state and the other atom of the metal is in the +1 oxidation state, have activity substantially the same as mononuclear compounds wherein one atom of the metal is solely in the +3 oxidation state.

While the catalyst systems of the present invention can be used to polymerize a variety of alpha-olefins, they are especially useful in the polymerization of ethylene. These catalysts produce linear polyethylene, i.e., polyethylene with substantially no side branches in high yield.

The catalyst systems of the present invention comprise at least one dimeric mixed-valent cyclopentadienyl Group 6b metal compound in which one atom of the Group 6b metal is in an oxidation state of +3 and in which the other metal atom is in an oxidation state of +1, in which catalyst precursor is catalytically active when deposited on a solid inorganic support such as an inorganic metal phosphate support. Furthermore, the mixed-valent dimeric cyclopentadienyl Group 6b metal compound catalyst precursors of this invention are ferromagnetically coupled.

As used herein, the term "cyclopentadienyl" refers to cyclopentadienyl itself or to substituted derivatives of cyclopentadienyl in which the cyclopentadienyl ring contains one or more substituents which do not interfere with the Group 6b metal compound's ability to function as an alpha-olefin polymerization catalyst. Examples of substituted cyclopentadienyl include pentamethylcyclopentadienyl, ethyltetramethylcyclopentadienyl, methylcyclopentadienyl, t-butylcyclopentadienyl, and pentaphenylcyclopentadienyl, as well as compounds where the substituent forms a multicyclic ring with the cyclopentadienyl ring. Examples of these multicyclic rings include indenyl and fluorenyl rings. For the sake of simplicity, the abbreviation Cp* will be used herein to refer to pentamethylcyclopentadienyl. Cp* is a preferred cyclopentadienyl group as it stabilizes the organometallic compounds of this invention.

The Group 6b metal compounds useful in the present invention include compounds wherein the metal is chromium, molybdenum or tungsten. Compounds in which the metal is chromium are preferred. The Group 6b metal atoms in the dimer compound before deposition onto the inorganic support has a mixed-valent oxidation state wherein one Group 6b metal atom is in the +1 oxidation state and the other metal atom is in the +3 oxidation state.

The Group 6b metal dimers have, in addition to one cyclopentadienyl group per metal atom, at least one hydrocarbyl group bonded to each metal atom. The Group 6b metal atom in the +3 oxidation state may suitably be bonded to at least one hydrocarbyl group having from 1–20 carbon atoms. The Group 6b metal atom in the +3 oxidation state is pi bonded to the cyclopentadienyl group; sigma bonded to a hydrocarbyl group and sigma bonded to the alkyl portion of an alkaryl group which is, in turn, coordinately bonded through the aryl portion of the alkaryl group to the Group 6b metal in the +1 oxidation state. The Group 6b metal in the +1 oxidation state is also, of course, pi bonded to a cyclopentadienyl group. In effect, the sigma bond of the Group 6b metal in the +3 oxidation state to the alkyl portion of the alkaryl group is a bridge between the Group 6b atoms in the +1 and +3 oxidation states since the aryl portion of the alkaryl group is coordinately bonded to the Group 6b metal atom in the +1 oxidation state. The bridging effect is shown diagrammatically below where Cr is used as the Group 6b metal and benzyl is used as both the hydrocarbyl and alkaryl group for simplicity only.

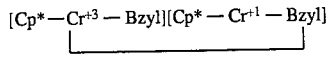

As used herein, the term "hydrocarbyl" refers to alkyl, alkenyl, aryl, aralkyl and alkaryl radicals and the like. Exemplary hydrocarbyl radicals include, but are not limited to, methyl, ethyl, propyl, butyl, amyl, isoamyl, hexyl, neopentyl, isobutyl, heptyl, octyl, nonyl, decyl, cetyl, phenyl, benzyl and other similar groups. Additionally, organosilyl groups which are bonded to the chromium atom(s) through a carbon atom can be used. Trimethylsilyl methyl, i.e., $(CH_3)_3SiCH_2-$, and the like are examples of such organosilyl groups. If more than one hydrocarbyl group is bonded to the metal atom, they can be independent or linked, i.e., they can form a 3-, 4-, 5-, 6-, or 7-membered metallocycle.

It is necessary in accordance with the findings of this invention that the Group 6b metal atom in the +1 oxidation state be coordinately bonded to the aryl portion of an alkaryl radical. As used herein, the term "alkaryl" refers to alkaryl radicals having from 7–20 carbon atoms. The simplest alkaryl radical is benzyl.

Examples of the alkaryl radicals useful in this invention include, but are not limited to, compounds having the following general formula:

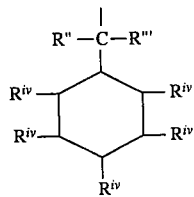

wherein R"; R'" and $R^{iv}$ can at each independent occurrence be hydrogen or an alkyl group having from 1–4 carbon atoms with the proviso that the sum of the carbon atoms in R", R'" and $R^{iv}$ is from 0–14.

The preferred alkaryl radical having the above formula is benzyl.

It is quite surprising that the dimeric mixed-valent Group 6b metal compound catalyst precursors of this invention do not possess chromium to chromium metal bonds. U.S. Pat. No. 5,240,895, the teachings of which are incorporated herein by reference, teaches that there are strong chromium-chromium multiple bonds present in $[Cp*Cr(CH_3)]_2$ which make it virtually unreactive towards ethylene. It has been found in accordance with this invention that when at least one of the hydrocarbyl groups attached to the metal is an alkaryl group, this allows one to prepare a mixed-valent metal compound catalyst precursor without metal to metal bonds, which precursor is catalytically active when deposited on an inorganic support.

Examples of the Group 6b metal compounds useful in this invention include, but are not limited to, compounds having the following general formula:

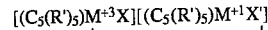

wherein M is a Group 6b metal such as chromium, molybdenum and tungsten;

$(C_5(R')_5)$ is a cyclopentadienyl ring,

R' is at each independent occurrence hydrogen, a hydrocarbyl radical having 1–20 carbon atoms, or adjacent R' groups may together form one or more hydrocarbyl rings;

X is a hydrocarbyl radical having 1–20 carbon atoms (for example, a monovalent saturated aliphatic or alicyclic radical or a monovalent aryl or alkaryl radical, or combinations thereof), or an organosilyl group such as trimethylsilylmethyl;

and X' is an alkaryl radical having from 7–20 carbon atoms.

Preferably the Group 6b mixed-valent metal compound catalyst precursors of this invention have the general formula:

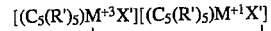

wherein M; $(C_5(R')_5)$; and X' are as defined above.

Examples of compounds having the formulas above include, but are not limited to, $[Cp*Cr^{+3}(Bzyl)] [Cp*Cr^{+1}(Bzyl)]$; $[Cp*Cr^{+3}CH_3] [Cp*Cr^{+1}(Bzyl)]$; and $[Cp*Cr^{+3}CH_2Si(CH_3)_3] [Cp*Cr^{+1}(Bzyl)]$ where Bzyl is benzyl and Cr is in a mixed-valent state where one atom of Cr is in the +1 oxidation state and one atom of Cr is in the +3 oxidation state and wherein the Cr is bonded as noted above.

In part, the choice of Group, 6b metal compound is based on its ease of preparation. Of the Group 6b metal compounds useful in this invention, the organochromium compounds are preferred.

In the catalyst systems of the present invention, the Group 6b metal compound is deposited on an inorganic support. Suitable inorganic metal oxide supports include silica, alumina, silica-alumina mixtures, thoria, zirconia, magnesium oxide and similar oxides. Suitable inorganic metal phosphates include aluminum phosphate, zirconium phosphate, magnesium-containing alumina phosphate and alumina aluminum phosphate. Silicas, aluminum phosphates, silica aluminum phosphates and alumina aluminum phosphates are preferred. Suitable silica supports include Davison 952, Davison 955, Crosfield EP-10 and Crosfield EP17MS. Further examples of useful supports are the following: alumina aluminum phosphates with aluminum to phosphorus ratios of about 5:1 to 1:1 as disclosed in U.S. Pat. Nos. 4,080,311 and 4,219,444; magnesia-alumina-aluminum phosphates as described in U.S. Pat. No. 4,210,560; zinc oxide-cadmium oxide-alumina-aluminum phosphates such as those disclosed in U.S. Pat. No. 4,367,067; and the calcium, barium, i 7 and/or strontium oxide-alumina-aluminum phosphates described in U.S. Pat. Nos. 4,382,877 and 4,382,878. The acidity of these supports can be adjusted by judicious inclusion of basic metals such as alkali and alkaline earth metals (Ca, Be, Mg, K, Li) to counteract excessive acidity. Other useful supports include magnesium halides, particularly magnesium chloride, such as those described in "Transition Metals and Organometallics as Catalysts for Olefin Polymerization" (1988, Springer-Verlag) edited by W. Kaminsky and H. Sinn and "Transition Metal Catalyzed Polymerizations-Ziegler-Natta and Metathesis Polymerizations" (1988, Cambridge University Press) edited by R. Quirk.

The supports useful in this invention should have a high surface area. In general, these supports should have the characteristics listed in the following table:

| Property | Broad Range | Preferred Range |
|---|---|---|
| Surface area | 25–600 m$^2$/g | 100–370 m$^2$/g |
| Pore volume | 0.25–4 cm$^3$/g | 0.7–3 cm$^3$/g |
| Mean particle diameter | 10–200 microns | 60–140 microns |

Preferably, a significant percentage of the pores in the macropore range (>500 Angstroms). Preferably, at least 50% of the pores are macropores. It is also desirable that the support be substantially anhydrous before the Group 6b metal compound is deposited on it. Thus, it is desirable to calcine the support prior to deposition of the Group 6b metal compound.

The supported catalysts of this invention are readily prepared by techniques well known in the art. For example, a solution of the Group 6b metal compound in aliphatic, aromatic or cycloaliphatic hydrocarbons, or ethers such as diethyl ether or tetrahydrofuran can be stirred with the support until the Group 6b metal compound is absorbed on or reacted with the support. The amount of Group 6b metal compound relative to the amount of support will vary considerably depending upon such factors as the particle size of the support, its pore size and surface area, the solubility of the Group 6b metal compound in the solvent employed, and the mount of Group 6b metal compound which is to be deposited on the support. However, in general the mount of Group 6b metal compound used is adjusted so that the final metal content (calculated as the element), relative to the support, is in the range of from about 0.01 to about 10 weight percent. In most cases, the most desirable level is in the range of about 0.1 to about 5 weight percent. Preferably the catalysts are made at room temperature.

Activities for the catalyst systems of the present invention are greater than 3,000 grams of polymer per gram of chromium metal per hour ("g/g Cr/hr"), preferably greater than 30,000 g/g Cr/hr, and more preferably greater than 200,000 g/g Cr/hr.

It has been found that the activity of the supported Group 6b metal dimers of this invention is significantly increased when they are employed in conjunction with a co-catalyst. The co-catalysts useful in the practice of the present invention are Group 2 and Group 3 metal alkyls. As used herein, the term "Group 2 and Group 3 metal alkyls" refers to compounds containing a metal from Group 2 or Group 3 of the Periodic Table (such as Mg, Zn, B, or Al) which is bonded to at least one alkyl group, preferably a $C_1$ to $C_8$ alkyl group. Suitable Group 2 and Group 3 metal alkyls include dialkyl magnesium, dialkyl zinc, trialkylboranes, and aluminum alkyls. Suitable aluminum alkyls include trialkylaluminums (such as trimethylaluminum, triethylaluminum, triisobutylaluminum and trioctylaluminum).

Trialkylaluminums with alkyl groups of four carbons or greater are preferred. Other aluminum alkyls useful in the practice of the present invention include alkylaluminum alkoxides (such as diethylaluminum ethoxide and ethylaluminum diethoxide), and alkylaluminum halides (such as diethylaluminum chloride, diethylaluminum bromide, diethylaluminum iodide, diethylaluminum fluoride, ethyl aluminum dichloride, ethyl aluminum dibromide, ethyl aluminum diiodide, ethyl aluminum difluoride, and ethyl aluminum sesquichloride).

Other suitable aluminum alkyls are aluminoxanes, including those represented by the general formula $(R—Al—O)_n$ for the cyclic form and $R(R—Al—O)_{-n}—AlR_2$ for the linear form. In these formulas, R is, at each independent occurrence, an alkyl group (such as methyl, butyl, isobutyl and the like) preferably with more than two carbon atoms, more preferably with 3–5 carbon atoms, and n is an integer, preferably from 1 to about 20. Most preferably, R is an isobutyl group. Mixtures of linear and cyclic aluminoxanes may also be used. Examples of aluminoxanes useful in this invention include, but are not limited to, ethyl aluminoxane, isobutyl aluminoxane, and methyl aluminoxane. Aluminoxanes (also known as "alumoxanes") suitable for use in this invention are described in Pasynkiewicz, "Alumoxanes: Synthesis, Structures, Complexes and Reactions," *Polyhedron* 9, p. 429 (1990), which is incorporated by reference herein in its entirety.

The preferred Group 2 and Group 3 metal alkyls are the aluminoxanes and the trialkylaluminums.

When used, the Group 2 and Group 3 metal alkyls are used in a Group 2 or 3 metal alkyl to Group 6b metal compound mole ratio of from about 1:1 to about 1,000:1. The preferred mole ratio is from about 10:1 to about 200:1.

The catalyst systems of the present invention may be used in either solution, slurry or gas phase polymerization processes. After the catalysts have been formed, the polymerization reaction is conducted by contacting the monomer charge with a catalytic amount of the catalyst at a temperature and at a pressure sufficient to initiate the polymerization reaction. If desired, an organic solvent may be used as a diluent and to facilitate materials handling. The polymerization reaction is carried out at temperatures of from about 300° C. or less up to about 2000° C. or more, depending to a great extent on the operating pressure, the pressure of the entire monomer charge, the particular catalyst being used, and its concentration. Preferably, the temperature is from about 300° C. to about 1250° C. The pressure can be any pressure sufficient to initiate the polymerization of the monomer charge, and can be from atmospheric up to about 1,000 psig. As a general rule, a pressure of about 20 to about 800 psig is preferred.

When the catalyst is used in a slurry-type process, an inert diluent medium is used. The diluent should be one which is inert to all other components and products of the reaction system, and be stable at the reaction conditions being used. It is not necessary, however, that the inert organic diluent medium also serve as a solvent for the polymer produced. The inert organic diluents which may be used include saturated aliphatic hydrocarbons (such as hexane, heptane, pentane, isopentane, isooctane, purified kerosene and the like), saturated cycloaliphatic hydrocarbons (such as cyclohexane, cyclopentane, dimethylcyclopentane, methylcyclopentane and the like), aromatic hydrocarbons (such as benzene, toluene, xylene and the like), and chlorinated hydrocarbons (such as chlorobenzene, tetrachloroethylene, o-dichlorobenzene and the like). Particularly preferred diluents are cyclohexane, pentane, isopentane, hexane and heptane.

When the catalyst is used in a gas phase process, it is suspended in a fluidized bed with, e.g., ethylene. Temperature, pressure and ethylene flow rates are adjusted so as to maintain acceptable fluidization of the catalyst particles and resultant polymer particles. Further descriptions of such a fluidized bed may be found in British Patent No. 1,253,063, to Karapinka, which is incorporated by reference herein.

The term "molecular weight distribution" (MWD), as used herein, is the weight average molecular weight ("$M_w$") divided by the number average molecular weight ("$M_n$"), i.e., $M_w/M_n$. In general, the polymers which have broad MWDs, have improved ease of processing, better melt behavior, and other desirable properties such as impact resistance and environmental stress crack resistance. Large blow molded products are superior when made with broad MWD polymers. Additionally, film is more puncture resistant when made from polymer with a broad MWD. The polymers made in accordance with this invention using aluminum phosphate supported catalysts possess high molecular weight and a more narrow MWD, making them useful in such applications as injection molding. When $H_2$ is employed in the reaction, the resulting polymers have a broad MWD.

It has quite surprisingly been found that when the catalyst systems of this invention are used to produce ethylene homopolymers, the resulting polyethylenes are highly linear, whereas ethylene homopolymers prepared using similar catalysts systems contain significant amounts of side chain branching. This is demonstrated by C13 NMR analysis. Here, for example, polyethylene prepared in accordance with the present invention using [Cp*Cr$^{+3}$(Bzyl)][Cp*Cr$^{+1}$(Bzyl)] supported on AlPO$_4$ with IBAO co-catalyst has 0 side chain branches ("SCB") per 1,000 carbon atoms in the polyethylene. (See Table I below.) In contrast, polyethylenes made using bis(cyclopentadienyl)-chromium (II) (i.e., chromocene) supported on AlPO$_4$ are reported to contain 0.6 to 0.7 mole percent of side chain branches (see U.S. Pat. No. 4,424,139).

Further, it has been found that, in contrast to supported C$_4$(TMSM)s catalysts which produce polymer with extremely broad molecular weight distributions (MWD= 140, see Run 7 in Comparative Example A of U.S. Pat. No. 5,240,895), the catalysts of the present invention yield polymers with extremely narrow MWD (see Examples 5–10 in Table I below). This surprising result underscores the unpredictable nature of supported organochromium catalysts and their polymerization products.

The following examples are intended to further illustrate the present invention, and are not intended to limit its scope.

All manipulations of compounds were carried out by standard Schlenk, vacuum and glove box techniques. All solvents were thoroughly dried over Na/benzophenone or calcium hydride and distilled prior to use. LiCp* and [Cp*CrCl]$_2$ were synthesized by literature procedures, i.e., for the LiCp* see R. S. Threlkel, et al, *J. Organomet. Chem.* (1977), 137, 1; and the [Cp*CrCl ]$_2$ see R. A. Heintz et al, *J. Organomet. Chem. Soc.* 1994, 116, xxxx.

EXAMPLE 1

Preparation of
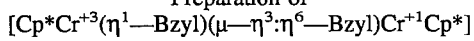
[Cp*Cr$^{+3}$($\eta^1$—Bzyl)($\mu$—$\eta^3$:$\eta^6$—Bzyl)Cr$^{+1}$Cp*]

0.375 g (0.84 mmol) of (Cp*CrCl)$_2$ was dissolved in 50 ml of pentane and cooled to –40° C. 1.68 ml (2 eq., 1.68 mmol) benzyl magnesium chloride (1M in ether) was slowly added to this solution. This reaction was allowed to stir for four hours and then filtered to remove the MgCl$_2$ formed. Crystallization from a mixture of Et$_2$O and pentane gave 0.349 g (75 % yield) of [Cp*Cr$^{+3}$($\eta^1$—Bzyl)($\mu$—$\eta^3$:$\eta^6$—Bzyl)Cr$^{+1}$Cp*] as brown needles.

Anal. calcd. for C$_{34}$H$_{44}$Cr$_2$: C, 73.35; H, 7.97; N, O. Found: C, 73.51; H, 8.06; N, O.

EXAMPLE 2

Preparation of AlPO$_4$ Supported Dimeric Catalysts

The dimeric mixed-valent chromium compound (0.031 g, 5.57×10$^{-5}$ moles) prepared as described in Example 1 was dissolved in 20 ml of pentane, giving a brown color solution to which was added 0.5 g of AlPO$_5$ purchased from Grace-Davison Company. The AlPO$_4$ was dehydrated for 16 hours at 400° C. before use. The resulting mixture was stirred for 5 minutes. The resulting solid catalyst was washed with pentane, and dried in vacuo to a free-flowing powder.

EXAMPLE 3

Preparation of Cp*Cr(Bzyl)$_2$(Pyr) (Monomeric Catalyst)

A THF solution (50 ml) of [Cp*CrCl$_2$]$_2$ was formed by stirring CrCl$_3$(THF)$_3$ (1.003 g, 2.67 mmol) and Cp*Li (0.382 g, 2.69 mmol) together for one hour. 2.67 ml (2.00 eq.) of BzylMgCl (2.0M in THF, 5.3 mmol) was added dropwise to this blue solution. Pyridine (2 ml) was added after another hour and the solution was allowed to stir for an additional 20 minutes. 1,4-dioxane (3 ml) was then added to aid the precipitation of MgCl$_2$. After removing all volatiles, the solid was extracted with Et$_2$O and crystallized from the same solvent at –40° C. Total yield: 0.801 g (67%).

Anal. calcd. for C$_{29}$H$_{34}$NCr:C, 77.65; H, 7.64; N, 3.12. Found: C, 77.78; H, 7.85 and N, 3.17.

The Cr is in the +3 oxidation state.

EXAMPLE 4

Preparation of AlPO$_4$ Supported Monomeric Catalyst

The monomeric chromium compound (0.046 g) prepared as described in Example 3 above was dissolved in 20 ml of pentane giving a brown color solution to which was added 0.5 g of AlPO$_4$ purchased from Grace-Davison Company. The AlPO$_4$ was dehydrated at 400° C. for 16 hours before use. The resulting mixture was stirred for 5 minutes. The resulting solid catalyst was washed with pentane, dried in vacuo to a free-flowing powder.

COMPARATIVE EXAMPLE A

A solution of 30 mg (5.39×10$^{-5}$ mole) of the catalyst of Example 1 in 50 ml of pentane was exposed to ethylene at ambient temperature and atmospheric pressure for 2 hours and 115 mg of insoluble polymer were recovered. GPC analysis of the polymer gave average molecular weights as follows: $M_n$=3140; $M_w$=5120 with an MWD of 1.63.

EXAMPLE 5

Ethylene Polymerization Using Supported Catalyst

Polymerization runs were conducted in 2-liter autoclave reactors under particle form (slurry) conditions using 300 ml of heptane as a diluent, and a weighed amount of catalyst (typically 0.050–0.250 g). Run times of 0.5 to 1.0 hour were normally employed. For example, in a typical run, 0.050 g of the catalyst prepared in Example 2 was charged to a 2-liter autoclave along with 300 ml of heptane and 0.3 ml of a 1.0M heptane solution of isobutylaluminoxane purchased from AKZO. The reactor temperature and pressure were adjusted to 800° C. and 200 psi (with ethylene), respectively except in Run 8 where a partial pressure of 10 psig of hydrogen was used. The ethylene was supplied on demand from a pressurized reservoir. After 1.0 hour, the reaction was stopped by deactivating the stirrer and venting the pressure. The polymer produced was washed with isopropanol and acetone, and dried under vacuum to yield the indicated amounts of white granular solid. In the run for this example, the supported catalyst was the one prepared in Example 2 above and the results are summarized in Table I below. It is to be noted that the aluminum phosphate support was pretreated at 400° C. for 16 hours before the dimeric chromium compound of Example 1 was added to it. The dehydration occurred under fluidized bed type of conditions.

EXAMPLE 6

Example 5 was repeated giving substantially the same results as shown in Table I below.

EXAMPLE 7

Example 5 was repeated except the concentration of chromium was doubled and 40 ml of butene-1 were added to the reactor. The results are summarized in Table I below. Referring to Table I, a comparison of Examples 5 and 7 shows that the activity of the catalyst decreases and that no side chain branching was observed indicating that co-polymers of ethylene and butene-1 were not produced.

EXAMPLE 8

Example 5 was again repeated except hydrogen at a partial pressure of 10 psi was employed to determine the hydrogen sensitivity of this catalyst. The results are summarized in Table I below.

Referring to Table I, a comparison of Examples 5 and 8 shows that the molecular weight of the resulting product is considerably reduced indicating that this catalyst is highly sensitive to the effect of hydrogen.

EXAMPLE 9

Example 7 was repeated except no co-catalyst was employed and no co-monomer was employed. The results are shown in Table I below.

Referring to Table I, a comparison of Examples 7 and 9 shows that in the absence of a co-catalyst, the activity of the catalyst system is reduced.

EXAMPLE 10

Polymerization of Ethylene Using Supported Monomer Catalyst

Example 5 was repeated except using the catalyst of Example 4. The results are summarized in Table I below.

A comparison of Examples 5 and 10 shows that the concentration of chromium was about the same, i.e., about 11 µmol. However, all of the chromium in the catalyst for Example 10 was in the +3 oxidation state, whereas the chromium in the catalyst for Example 5 was 50% in the +3 oxidation state and 50% in the +1 oxidation state. It was surprising, therefore, that the mixed-valent dimeric chromium compound was as active as the known monomeric chromium catalyst where the chromium is all in the +3 state. This was especially surprising since a dimeric chromium compound similar to that for Example 1 above, except where the chromium atoms were both in the +1 oxidation state, was, under homogeneous conditions, totally inactive for the polymerization of ethylene as shown in Example 12 below.

EXAMPLE 11

Preparation of $Cr^{+1}$ Dimer

A portion (0.275 g) of the brown crystals from Example 1 were dissolved in 20 ml of toluene. This solution was sealed in an ampoule fitted with a teflon top. The ampoule was then heated to 50° C. in an oil bath for two days. Over this period, the color of the solution changed from brown to orange. The ampoule was then opened and the toluene removed by rotoevaporation. NMR analysis showed the product to be $[(Cp^*Cr^{+1})_2 (\mu-\eta^6:\eta^6-Bzyl-Bzyl)]$.

EXAMPLE 12

Comparative Example A was repeated except using the catalyst prepared as described in Example 11 above. No polyethylene was recovered.

TABLE I

| | | | | | | | POLYMER PROPERTIES | | | | | |
|---|---|---|---|---|---|---|---|---|---|---|---|---|
| Example | µ mol Cr | Co-catalyst | Al:Cr | g/g cat/ hr | g/g Cr/ hr | Density | $M_w^6$ | $M_w/M_n^6$ (MWD) | $SCB^7$ | $T_m^8$ °C. | $MI^9$ | $HLMI^{10}$ |
| 5 | 11.5 | $IBAO^3$ | 26 | $4,673^4$ | $403,000^5$ | 0.9313 | 897,100 | 2.68 | 0 | 135.58 | 0 | 0 |
| 6 | 11.1 | IBAO | 26.9 | 5,120 | 441,000 | 0.9293 | 804,300 | 2.13 | 0 | 136.58 | 0 | 0 |
| 7 | 22.1 | IBAO | 26.9 | 2,360 | 203,000 | 0.9303 | 975,400 | 3.43 | 0 | 133.1 | 0 | 0 |

POLYMERIZATION[1] OF ETHYLENE USING SUPPORTED[2] CATALYSTS

TABLE I-continued

POLYMERIZATION[1] OF ETHYLENE USING SUPPORTED[2] CATALYSTS

| Example | μ mol Cr | Co-catalyst | Al:Cr | g/g cat/hr | g/g Cr/hr | Density | $M_w$[6] | $M_w/M_n$[6] (MWD) | SCB[7] | $T_m$[8] °C. | MI[9] | HLMI[10] |
|---|---|---|---|---|---|---|---|---|---|---|---|---|
| 8 | 11.1 | IBAO | 26.9 | 4,060 | 350,000 | 0.9554 | 306,500 | 20.68 | 0 | 138.46 | 0 | 1.8 |
| 9 | 23 | NONE | 0 | 210 | 18,000 | 0.9311 | 994,700 | 3.91 | 0 | 134.11 | 0 | 0 |
| 10 | 10.3 | IBAO | 29 | 4,860 | 456,000 | 0.9287 | 1,359,000 | 2.56 | 0 | 134.53 | 0 | 0 |

[1]All Examples made at 80° C. and 200 psig of $C_2H_4$ except in Example 8 which used 190 psig $C_2H_4$ and 10 psig $H_2$. In Example 7 only, 40 ml of butene-1 were added.
[2]Supported on $AlPO_4$ dehydrated at 400° C. for 16 hours
[3]IBAO = Isobutylaluminoxane
[4]g/g cat/hr = grams of polymer per gram of catalyst per hour
[5]g/g Cr/hr = grams of polymer per gram of chromium per hour
[6]$M_2$ = Average Molecular Weight; $M_n$ is Number Average Molecular Weight and both were determined by GPC
[7]SCB = Side Chain Branching
[8]$T_m$ = Melt Temperature, determined by DSC
[9]MI = Melt Index by ASTM D-1238, Condition E
[10]HLMI = High Load Melt Index by ASTM D-1238, Condition F

What is claimed is:

1. A catalyst system for the homopolymerization of alpha-olefins having from 2–8 carbon atoms, said catalyst system comprising a mixed-valent dimeric Group 6b metal compound catalyst precursor wherein one atom of said Group 6b metal is a cyclopentadienyl Group 6b metal hydrocarbyl complex in which the Group 6b metal has an oxidation state +3 and wherein one atom of said Group 6b metal is a cyclopentadienyl alkaryl complex in which the Group 6b metal has an oxidation state +1, said dimeric Group 6b metal compound being supported on an inorganic support.

2. The catalyst system of claim 1 wherein the Group 6b metal is chromium.

3. The catalyst system of claim 1 wherein the Group 6b metal compound has the formula:

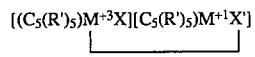

$$[(C_5(R')_5)M^{+3}X][C_5(R')_5)M^{+1}X']$$

wherein M is a Group 6b metal such as chromium, molybdenum and tungsten;

$(C_5(R')_5)$ is a cyclopentadienyl ring,
R' is at each independent occurrence hydrogen, a hydrocarbyl radical having 1–20 carbon atoms, or adjacent R' groups may together form one or more hydrocarbyl rings;
X is a hydrocarbyl radical having 1–20 carbon atoms;
and X' is an alkaryl radical having from 7–20 carbon atoms.

4. A catalyst system according to claim 3 wherein M is chromium; X is an alkaryl radical having from 7–20 carbon atoms and $(C_5(R')_5)$ is pentamethylcyclopentadienyl.

5. A catalyst system according to claim 4 wherein X and X' are benzyl.

6. A catalyst system according to claim 3 wherein X is methyl and X' is benzyl.

7. The catalyst system of claim 5 wherein the support is an inorganic metal oxide or inorganic metal phosphate.

8. The catalyst system of claim 7 wherein the support is an aluminum phosphate.

9. The catalyst system of claim 1 which contains in addition a Group 2 or 3 metal alkyl compound.

10. The catalyst system of claim 9 wherein the Group 6b metal is chromium.

11. The catalyst system of claim 10 wherein the cyclopentadienyl Group 6b metal hydrocarbyl complex: is a cyclopentadienyl chromium alkaryl complex.

12. The catalyst system of claim 11 wherein each alkaryl group is a benzyl group.

13. The catalyst system of claim 3 which contains in addition a Group 2 or 3 metal alkyl compound.

14. The catalyst system of claim 13 wherein X is alkaryl, M is chromium and the Group 2 or 3 metal is an aluminum alkyl compound.

15. The catalyst system of claim 14 wherein X and X' are benzyl and the inorganic oxide support is aluminum phosphate.

16. The catalyst system of claim 15 wherein the alkyl aluminum compound is selected from the group consisting of trialkylaluminum compounds, alkyl aluminum alkoxides, alkyl aluminum halides and aluminoxanes.

17. The catalyst system of claim 16 wherein the alkyl aluminum compound is an aluminoxane.

18. A process for the polymerization of an alpha-olefin having from 2–8 carbon atoms which comprises contacting said alpha-olefin under polymerization reaction conditions in the contact presence of a catalyst system according to any of claims 1–17.

19. A process according to claim 18 wherein the alpha-olefin is ethylene.

20. A process according to claim 19 wherein the process is operated in the added presence of hydrogen.

* * * * *